(12) United States Patent
Anand et al.

(10) Patent No.: US 11,917,655 B2
(45) Date of Patent: Feb. 27, 2024

(54) APPARATUS, SYSTEM AND METHOD OF RESOURCE UNIT (RU) ALLOCATION FOR MULTI USER (MU) DOWNLINK ORTHOGONAL-FREQUENCY-DIVISION-MULTIPLE-ACCESS (OFDMA) TRANSMISSION

(71) Applicant: INTEL CORPORATION, Santa Clara, CA (US)

(72) Inventors: Arjun Anand, Santa Clara, CA (US); Vinod Kristem, San Jose, CA (US); Rath Vannithamby, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 913 days.

(21) Appl. No.: 16/727,271

(22) Filed: Dec. 26, 2019

(65) Prior Publication Data

US 2021/0204291 A1 Jul. 1, 2021

(51) Int. Cl.
  *H04W 4/00* (2018.01)
  *H04W 72/52* (2023.01)
  *H04L 5/00* (2006.01)

(52) U.S. Cl.
  CPC ........... *H04W 72/52* (2023.01); *H04L 5/0007* (2013.01)

(58) Field of Classification Search
  CPC ............................. H04W 5/00; H04W 5/0007
  See application file for complete search history.

(56) References Cited

U.S. PATENT DOCUMENTS

| 11,265,927 | B1* | 3/2022 | Chu | H04W 74/085 |
|---|---|---|---|---|
| 2017/0265210 | A1* | 9/2017 | Huang | H04W 72/0453 |
| 2019/0238288 | A1* | 8/2019 | Liu | H04L 5/0037 |
| 2020/0137772 | A1* | 4/2020 | Inohiza | H04W 72/1268 |
| 2021/0368350 | A1* | 11/2021 | Cariou | H04W 16/14 |

OTHER PUBLICATIONS

IEEE Std 802.11™—2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.
IEEE P802.11ax/D4.0 Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN, Feb. 2019, 746 pages.

* cited by examiner

*Primary Examiner* — Mohammad S Adhami
*Assistant Examiner* — Elisabeth Benoit Magloire
(74) *Attorney, Agent, or Firm* — Shichrur & Co.

(57) ABSTRACT

For example, a wireless communication device may be configured to determine a Resource Unit (RU) allocation of a plurality of RUs to a plurality of wireless communication stations (STAs), respectively, the RU allocation to allocate to a STA of the plurality of STAs an RU of the plurality of RUs, wherein an RU size of the RU allocated to the STA is based at least on a traffic rate parameter, which is dependent on a traffic rate of Downlink (DL) traffic for the STA; and to transmit a Multi-User (MU) DL Orthogonal-Frequency-Division-Multiple-Access (OFDMA) Physical-layer Protocol Data Unit (PPDU) to the plurality of STAs according to the RU allocation.

24 Claims, 5 Drawing Sheets

APPARATUS, SYSTEM AND METHOD OF RESOURCE UNIT (RU) ALLOCATION FOR MULTI USER (MU) DOWNLINK ORTHOGONAL-FREQUENCY-DIVISION-MULTIPLE-ACCESS (OFDMA) TRANSMISSION

TECHNICAL FIELD

Embodiments described herein generally relate to Resource Unit (RU) allocation for Multi-User (MU) downlink Orthogonal-Frequency-Division-Multiple-Access (OFDMA) transmission.

BACKGROUND

An Access Point (AP) and a plurality of wireless communication stations (STAs) may be configured to transmit a Multi-User (MU) Downlink (DL) Orthogonal Frequency Division Multiple Access (OFDMA) transmission to a plurality of stations.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
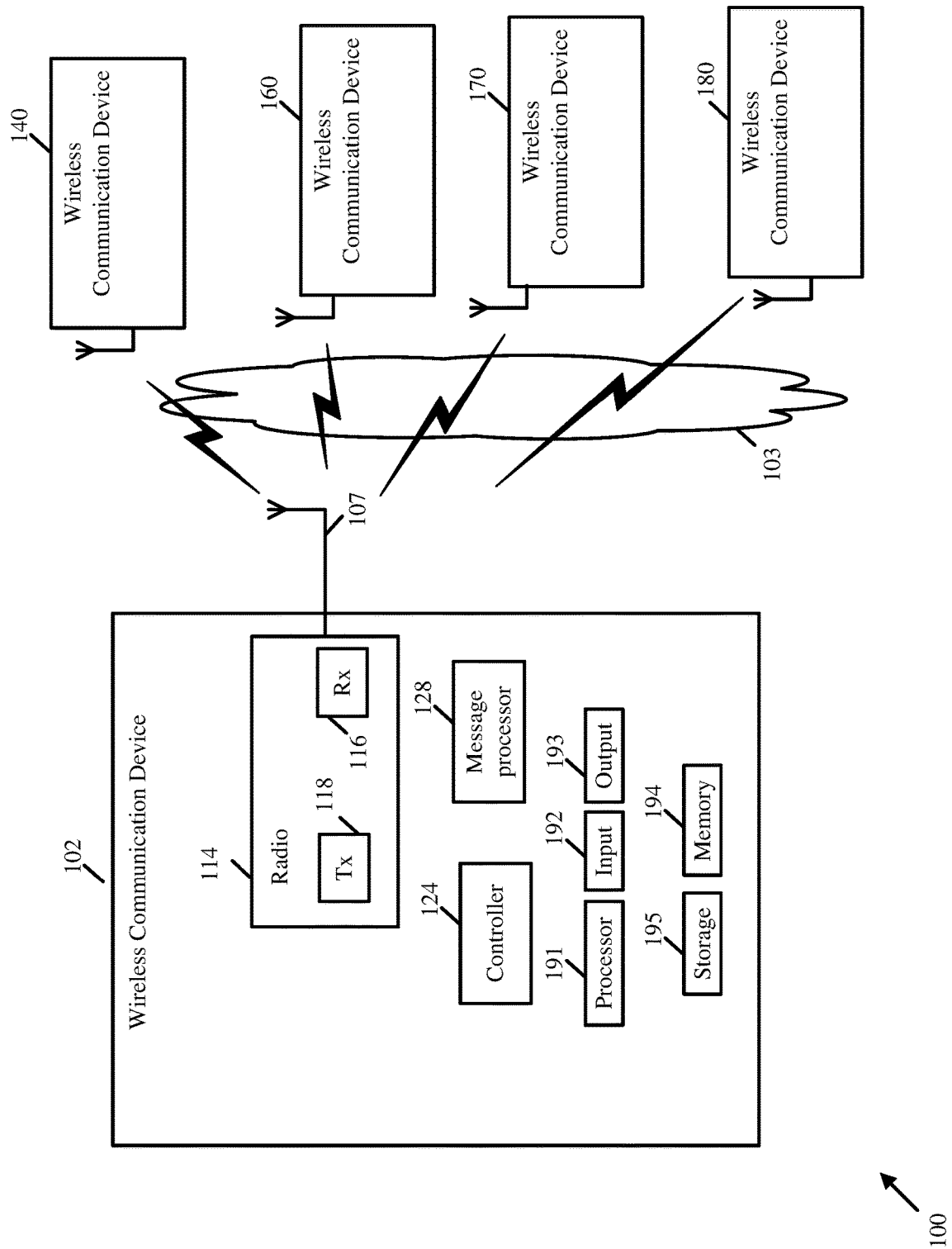
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AN) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016), and IEEE 802.11ax (IEEE P802.11ax/D4.0 Draft Standard for Information technology-Tele-communications and information exchange between systems Local and metropolitan area networks Specific requirements, Part 11: Wireless LAN Medium Access Control (MAC) and Physical Layer (PHY) Specifications, Amendment 1: Enhancements for High Efficiency WLAN, February, 2019)); and/or future versions and/or derivatives thereof, devices and/or networks operating in accordance with existing WFA Peer-to-Peer (P2P) specifications (including Wi-Fi P2P technical specification, version 1.5, Aug. 4, 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a Wi-Fi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz, 5 GHz and/or 6-7 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a Wi-Fi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

Some demonstrative embodiments are described herein with respect to Wi-Fi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102, 140, 160, 170 and/or 180.

In some demonstrative embodiments, wireless communication devices 102, 140, 160, 170 and/or 180 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102, 140, 160, 170 and/or 180 may include, operate as, and/or perform the functionality of one or more STAs. For example, devices 102, 140, 160, 170 and/or 180 may include at least one STA.

In some demonstrative embodiments, devices 102, 140, 160, 170 and/or 180 may include, operate as, and/or perform the functionality of one or more WLAN STAs.

In some demonstrative embodiments, devices 102, 140, 160, 170 and/or 180 may include, operate as, and/or perform the functionality of one or more Wi-Fi STAs.

In some demonstrative embodiments, devices 102, 140, 160, 170 and/or 180 may include, operate as, and/or perform the functionality of one or more BT devices.

In some demonstrative embodiments, devices 102, 140, 160, 170 and/or 180 may include, operate as, and/or perform the functionality of one or more Neighbor Awareness Networking (NAN) STAs.

In some demonstrative embodiments, one or more of wireless communication devices 102, 140, 160, 170 and/or 180, e.g., devices 102, may include, operate as, and/or perform the functionality of an Access Point (AP) STA.

For example, the AP may include a router, a PC, a server, a Hot-Spot and/or the like.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components.

In some demonstrative embodiments, some or all of the components of one or more of device 102 may be enclosed in a common housing or packaging, and may be interconnected or operably associated using one or more wired or wireless links. In other embodiments, components of one or more of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195, for example, a hard disk drive, a Solid State Drive (SSD), a floppy disk drive, a Compact Disk (CD) drive, a CD-ROM drive, a DVD drive, or other suitable removable or non-removable storage units.

Memory unit 194 and/or storage unit 195, for example, may store data processed by device 102.

In some demonstrative embodiments, wireless communication devices 102, 140, 160, 170 and/or 180 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wi-Fi channel, an IR channel, a Bluetooth (BT) channel, and the like.

In some demonstrative embodiments, wireless communication medium 103 may include a wireless communication channel over a 2.4 Gigahertz (GHz) frequency band, a 5 GHz frequency band, a 6-7 GHz band, a millimeterWave (mmWave) frequency band, e.g., a 60 GHz frequency band, a Sub-1 GHz (S1G) band, and/or any other frequency band.

In some demonstrative embodiments, devices 102, 140, 160, 170 and/or 180 may include one or more radios including circuitry and/or logic to perform wireless communication between devices 102, 140, 160, 170 and/or 180, and/or one or more other wireless communication devices. For example, device 102 may include a radio 114.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative embodiments, radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative embodiments, radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 may include or may be implemented as part of a wireless Network Interface Card (NIC), and the like.

In some demonstrative embodiments, radio 114 may be configured to communicate over a 2.4 GHz band, a 5 GHz band, an mmWave band, a S1G band, and/or any other band.

In some demonstrative embodiments, radio 114 may include, or may be associated with, one or more antennas 107.

In one example, device 102 may include a single antenna 107. In another example, device may include two or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. Antennas 107 may include, for example, antennas suitable for directional communication, e.g., using beamforming techniques. For example, antennas 107 may include a phased array antenna, a multiple element antenna, a set of switched beam antennas, and/or the like. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, device 102 may include a controller 124 configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160, 180, and/or one or more other devices, e.g., as described below.

In some demonstrative embodiments, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124, respectively. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, at least part of the functionality of controller 124 may be implemented as part of one or more elements of radio 114.

In other embodiments, the functionality of controller 124 may be implemented as part of any other element of device 102.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative embodiments, message processor 128 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processor 128. Additionally or alternatively, one or more functionalities of message processor 128 may be implemented by logic, which may be executed by a machine and/or one or more processors, e.g., as described below.

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, wireless communication devices 102, 140, 160, 170 and/or 180 may form, or may communicate as part of, a wireless local area network (WLAN).

In some demonstrative embodiments, wireless communication devices 102, 140, 160, 170 and/or 180 may form, or may communicate as part of, a Wi-Fi network.

In other embodiments, wireless communication devices 102, 140, 160, 170 and/or 180 may form, and/or communicate as part of, any other additional or alternative network.

In some demonstrative embodiments, device 102 may include, operate as, perform the role of, and/or perform one or more functionalities of an AP STA.

In some demonstrative embodiments, devices 102, 140, 160, 170 and/or 180 may include, operate as, perform the role of, and/or perform one or more functionalities of, one or more STAs. For example, devices 102, 140, 160, 170 and/or 180 may include at least one STA.

In some demonstrative embodiments, there may be a need to address one or more inefficiencies, disadvantages and/or technical problems in one or more use cases and/or scenarios, for example, with usage of one or more IEEE802.11 Standards, standard enhancements, or any other Standards, for example, for simultaneous DL transmissions to multiple STAs, e.g., as described below.

In some demonstrative embodiments, devices 102, 140, 160, 170 and/or 180 may be configured to implement Multi-User (MU) Downlink (DL) Orthogonal Frequency Division Multiple Access (OFDMA) transmissions, for example, in accordance with an IEEE802.11ax Standard, e.g., as described below.

In some demonstrative embodiments, the MU DL OFDMA transmissions may be configured for transmission of frames, e.g., data frames and/or control frames, for example, from an AP, e.g., device 102, to a plurality of wireless communication stations (STAs), e.g., devices 140, 160, 170 and/or 180.

In some demonstrative embodiments, in some use cases, implementations, scenarios, and/or deployments, there may be an overlap between a plurality of wireless networks, for example, multiple Basic Service Sets (BSSs). For example, in multi-dwelling units, for example, apartments in an urban area, one or more APs, e.g., WiFi APs, may be deployed in an uncoordinated manner, e.g., by multiple vendors. According to this example, a BSS may overlap, e.g., fully or partially, with one or more other BSSs. For example, transmissions in one BSS may be listened by one or more terminals, e.g., STAs and/or or APs, in at least one other BSS, for example, if multiple BSSs use the same or overlapping frequency bands. In one example, two or more overlapping BSSs may use different bandwidths and/or primary channels, which may create multiple overlap patterns.

In some demonstrative embodiments, an AP, e.g., device 102, may be configured to implement a Distributed Coordination Function (DCF), for example, based on Carrier Sense Multiple Access-Collision Avoidance (CSMA-CA) mechanisms, and/or any other collision avoidance mechanism, to "win a Transmit Opportunity (TXOP), e.g., in accordance with an IEEE 802.11 Standard and/or any other standard or protocol. However, in some use cases, scenarios, implementations, and/or deployments, the DCF may incur high delays, for example, in dense environments, e.g., when a large number of STAs is to be served by the AP. These high delays may result in poor performance, for example, in terms of user Quality of Experience (QoE), which may be an important factor, for example, for some interactive and/or real-time applications and/or any other applications. Additionally, the collision avoidance mechanisms may incur high overheads at the AP, for example, when the AP is required to send a large amount of short latency critical packets to the STAs.

In some demonstrative embodiments, there is a need to provide a technical solution, which may support an AP, e.g., device 102, in using its TxOP efficiently, for example, in dense environments and/or any other deployments, for example, to serve as many STAs as possible and/or while ensuring the throughput requirements of individual STAs, e.g., to ensure low delays.

In some demonstrative embodiments, devices of system 100, e.g., devices 102, 140, 160, 170 and/or 180, may be configured to implement Orthogonal Frequency Division Multiplexing (OFDMA) techniques, for example, in accordance with an IEEE 802.11ax Specification, and/or any other suitable Specification and/or protocol.

In some demonstrative embodiments, for example, the OFDMA techniques may be implemented to support simultaneous DL transmission from an AP, e.g., device 102, to multiple STAs, e.g., devices 140, 160, 170 and/or 180, for example, by dividing a frequency band of a Physical Layer Protocol Data Unit (PPDU) into a plurality of smaller Resource Units (RUs), which may be allocated to the STAs, for example, in a manner which may support efficient utilization of a TxOP.

In some demonstrative embodiments, there is a need to provide a technical solution to allow efficient allocation of the RUs to the STAs. For example, in some use cases, scenarios and/or implementations, it may be very important, or even critical, to choose appropriate RU sizes for transmissions, for example, in order to meet one or more performance parameters, for example, appropriate throughput levels, and/or appropriate target packet delays.

In some demonstrative embodiments, device 102 may be configured to implement one or more RU size selection algorithms for downlink transmissions, for example, MU DL OFDMA PPDU transmissions to devices 140, 160, 170 and/or 180, e.g., as described below.

In some demonstrative embodiments, RU size selection algorithms may be configured, for example, to support increased throughout, e.g., a peak throughput, and/or reduced latency, for example, in dense environments, for heterogeneous applications, and/or any other environment and/or implementation.

In some demonstrative embodiments, RU size selection algorithms may be configured, for example, to mitigate at least a technical problem of reduced throughput, e.g., in dense networks in multi-dwelling units, and/or to address one or more additional or alternative technical problems.

In some demonstrative embodiments, device 102 may be configured to determine an allocation of RU sizes to STAs of a MU DL OFDMA transmission, e.g., devices 140, 160, 170 and/or 180, for example, according to a traffic intensity aware RU size selection algorithm, e.g., as described below.

In some demonstrative embodiments, for example, a maximum throughput, which may be received by a STA in a MU DL OFDMA transmission form an AP may depend, e.g., may highly depend in some cases, on the RU size allocated by the AP to the STA, e.g., as described below.

Figure 2:
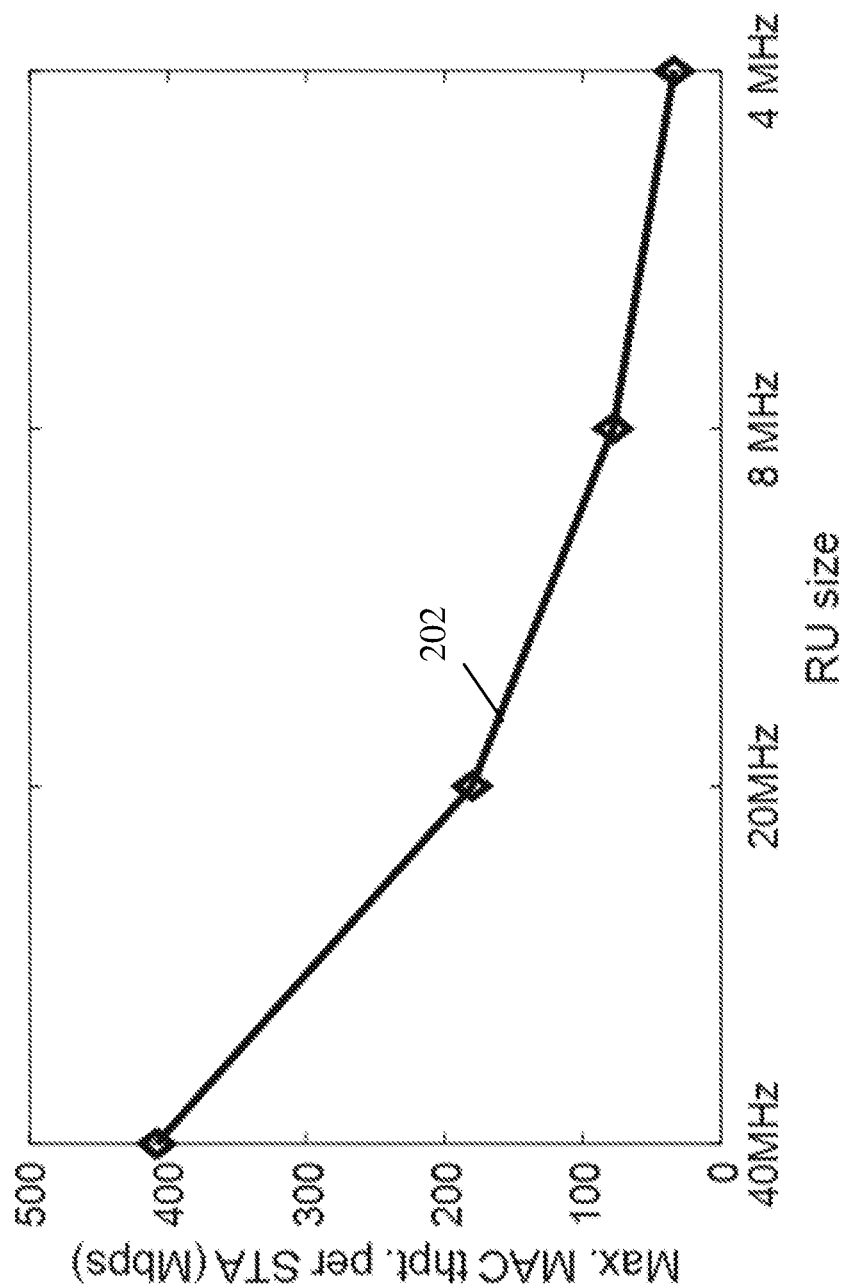
FIG. 2 is a schematic illustration of a graph depicting a maximal throughput as function of a Resource Unit (RU) size, which may be implemented in accordance with some demonstrative embodiments.

FIG. 2 is a schematic illustration of a graph depicting a maximal throughput 202 as function of a Resource Unit (RU) size, which may be implemented in accordance with some demonstrative embodiments.

For example, maximal throughput 202 may include a maximal MAC throughput per STA obtained under a Modulation and Coding Scheme (MCS) index 9, for example, with a 10% Packet Error Rate (PER), for various bandwidths.

For example, as shown in FIG. 2, the maximal throughput 202 may decrease with RU size.

In some demonstrative embodiments, there may be a technical need to support RU allocation for devices having different throughput requirements. For example, WLANs operating in accordance with an IEEE 802.11ax Specification and/or any other Specification, may be expected to support heterogeneous applications with different throughput requirements ranging, for example, from a few 100 Kilo bits per second (Kbps), e.g., for internet of Things (IoT) applications, to more than 30 Mega bits per second (Mbps), e.g., for Ultra-HD video streaming, and/or any other lower or higher rates.

Referring back to FIG. 1, in some demonstrative embodiments, there may be a technical need to provide a technical solution, which may support effective RU size selection by device 102, for example, in order to meet the heterogeneous throughput requirements of devices 140, 160, 170 and/or 180.

In some demonstrative embodiments, device 102 may be configured to implement one or more RU allocation algorithms, which may be configured to support selection, e.g., optimal selection, of RU sizes for downlink transmission, for example, based on one or more parameters corresponding to a throughput and/or traffic rate of the downlink transmission, for example, measured average buffer size, and/or any other additional or alternative parameter and/or criterion, e.g., as described below.

In some demonstrative embodiments, device 102 may be configured to implement one or more RU size selection algorithms, which may be configured, for example, to mitigate at least a technical problem of high packet delays, e.g., in dense networks in multi-dwelling units, and/or to address one or more additional or alternative technical problems.

In some demonstrative embodiments, device 102 may be configured to determine and/or detect one or more parameters corresponding to network congestion, e.g., as described below.

In some demonstrative embodiments, device 102 may be configured to determine or more RU size allocations, for example, based on the determined parameters corresponding to the network congestion, e.g., as described below.

In some demonstrative embodiments, controller 124 may be configured to control, cause and/or trigger device 102 to determine a Resource Unit (RU) allocation of a plurality of RUs to a plurality of STAs, e.g., including devices 140, 160, 170 and/or 180, e.g., as described below.

In some demonstrative embodiments, device 102 may determine the RU allocation of the plurality of RUs to the plurality of STAs, respectively, e.g., such that each STA is allocated with a respective RU. In other embodiments, one or more of the STAs may be allocated with more than one RU and/or different counts of RUs may be allocated to different STAs.

In some demonstrative embodiments, controller 124 may be configured to control, cause and/or trigger device 102 to determine the RU allocation to allocate to a STA of the plurality of STAs an RU of the plurality of RUs having a size, which is determined based on one or more RU size allocation criteria, e.g., as described below.

In some demonstrative embodiments, controller 124 may be configured to control, cause and/or trigger device 102 to determine an RU size of the RU allocated to the STA based, for example, at least on a traffic rate parameter, which is dependent on a traffic rate DL traffic for the STA, e.g., as described below.

In one example, for example, device 102 may be configured to determine an RU allocation for four STAs, e.g., including devices 140, 160, 170 and 180. For example, device 102 may be configured to determine a first RU size of a first RU allocated to a first STA, e.g., device 140, based at least on a first traffic rate parameter, which is dependent on a traffic rate of DL traffic for the first STA; to determine a second RU size of a second RU allocated to a second STA, e.g., device 160, based at least on a second traffic rate parameter, which is dependent on a traffic rate of DL traffic for the second STA; to determine a third RU size of a third RU allocated to a third STA, e.g., device 170, based at least on a third traffic rate parameter, which is dependent on a traffic rate of DL traffic for the third STA; and/or to determine a fourth RU size of a fourth RU allocated to a fourth STA, e.g., device 180, based at least on a fourth traffic rate parameter, which is dependent on a traffic rate of DL traffic for the forth STA.

In some demonstrative embodiments, controller 124 may be configured to control, cause and/or trigger device 102 to transmit a Multi-User (MU) DL OFDMA Physical-layer Protocol Data Unit (PPDU) to the plurality of STAs according to the RU allocation, e.g., as described below.

For example, device may transmit a MU DL OFDMA PPDU to the four STAs, e.g., devices 140, 160, 170 and 180, for example, using the first RU size for DL traffic to the first STA, the second RU size for DL traffic to the second STA, the third RU size for DL traffic to the third STA, and the fourth RU size for DL traffic to the fourth STA.

In some demonstrative embodiments, controller 124 may be configured to control, cause and/or trigger device 102 to monitor an average traffic rate of the DL traffic for a STA, and to dynamically adjust the RU size of the RU allocated to the STA based, for example, on the average traffic rate and an available throughout corresponding to the RU size, e.g., as described below.

For example, device 102 may be configured to monitor an average traffic rate of the DL traffic for device 140, and to dynamically adjust the RU size of the RU allocated to the device 140 based, for example, on the average traffic rate and an available throughout corresponding to the RU size.

In some demonstrative embodiments, controller 124 may be configured to control, cause and/or trigger device 102 to increase the RU size of the RU allocated to the STA, for example, when a difference between the average traffic rate and the available throughout is greater than a traffic rate upper threshold, e.g., as described below.

In some demonstrative embodiments, controller 124 may be configured to control, cause and/or trigger device 102 to reduce the RU size of the RU allocated to the STA, for example, when a difference between the average traffic rate and the available throughout is less than a traffic rate lower threshold, e.g., as described below.

In some demonstrative embodiments, controller 124 may be configured to control, cause and/or trigger device 102 to determine the RU size of the RU allocated to the STA, for example, based at least on a queue length of a queue for buffering the DL traffic for the STA, e.g., as described below.

In some demonstrative embodiments, controller 124 may be configured to control, cause and/or trigger device 102 to monitor an average queue length of the queue for buffering the DL traffic for the STA, and to dynamically adjust the RU size of the RU allocated to the STA, for example, based on the average queue length, e.g., as described below.

In some demonstrative embodiments, controller 124 may be configured to control, cause and/or trigger device 102 to increase the RU size of the RU allocated to the STA, for example, when the average queue length is greater than a queue upper threshold, e.g., as described below.

In some demonstrative embodiments, controller 124 may be configured to control, cause and/or trigger device 102 to reduce the RU size of the RU allocated to the STA, for example, when the average queue length is less than a queue lower threshold, e.g., as described below.

In some demonstrative embodiments, device 102 may be configured to determine and/or adjust the RU size of the RU allocated to the STA based on any other additional or alternative parameters and/or criteria.

In some demonstrative embodiments, controller 124 may be configured to control, cause and/or trigger device 102 to select the RU size of the RU allocated to the STA from a set of RU sizes including a plurality of different RU sizes, e.g., as described below.

In some demonstrative embodiments, controller 124 may be configured to control, cause and/or trigger device 102 to dynamically adjust the set of RU sizes, for example, based on one or more criteria, e.g., as described below.

In other embodiments, the set of RU sizes may be preconfigured and/or preset.

In some demonstrative embodiments, controller 124 may be configured to control, cause and/or trigger device 102 to adjust the set of RU sizes, for example, based at least on a congestion parameter corresponding to a congestion over a wireless communication channel for communicating with the plurality of STAs, e.g., as described below.

For example, device 102 may be configured to communicate MU DL OFDMA PPDU transmissions to the devices 140, 160, 170 and 180 over a wireless communication channel, and to dynamically adjust the set of RU sizes to be used for the devices 140, 160, 170 and 180, for example, based at least on a congestion parameter corresponding to a congestion over the wireless communication channel used for the MU DL OFDMA PPDU transmissions to the devices 140, 160, 170 and 180.

In some demonstrative embodiments, controller 124 may be configured to control, cause and/or trigger device 102 to adjust the set of RU sizes, for example, by determining a maximal RU size of the plurality of RU sizes in the set of RU sizes, for example, based at least on a congestion parameter corresponding to a congestion over a wireless communication channel for communicating with the plurality of STAs, e.g., as described below.

In some demonstrative embodiments, controller 124 may be configured to control, cause and/or trigger device 102 to determine the maximal RU size based, for example, on an access delay of the wireless communication device 102 to access the wireless communication channel, e.g., as described below.

In some demonstrative embodiments, controller 124 may be configured to control, cause and/or trigger device 102 to monitor an average access delay for accessing the wireless communication channel, and to dynamically adjust the maximal RU size based on a criterion relating to the average access delay, a target access delay, and/or a count of the plurality of STAs, e.g., as described below.

In other embodiments, device 102 may be configured to determine the maximal RU size based on any other additional or alternative parameters and/or criteria.

In some demonstrative embodiments, device 102 may be configured to implement one or more operations of a network congestion-aware RU size selection algorithm, for example, to determine and/or dynamically adjust a maximal RU size to be used by device 102, for example, for one or more MU DL OFDMA transmissions, e.g., even for any PPDU transmitted in the downlink, e.g., as described below.

In some demonstrative embodiments, device 102 may be configured to implement one or more operations of a traffic-aware RU size selection algorithm, for example, to determine and/or dynamically adjust one or more, e.g., appropriate, RU sizes for one or more STAs, e.g., for some or all STAs, for a MU DL OFDMA transmission, e.g., as described below.

In some demonstrative embodiments, device 102 may be configured to select one or more, e.g., some or all, RU sizes for one or more STAs, e.g., for some or all STAs, from a range of RU sizes available to the AP, e.g., from a smallest available RU size, e.g., as may be permitted by one or more applicable standards, to a maximum RU size, e.g., which may be determined according to the network congestion-aware algorithm and/or according to any other mechanism, e.g., as described below.

In some demonstrative embodiments, for example, in WLANs operating according to one or more IEEE 802.11 Standards and/or any other Standard, every terminal may be required to respect a collision avoidance protocol, for example, a CSMA-CA protocol, which may provide a fair mechanism for sharing TxOPs between terminals using distributed protocols.

In some demonstrative embodiments, in some use cases, deployments and/or scenarios, for example, in dense environments with many terminals, there may be a major issue of high delays and/or overheads in getting access to the wireless communication channel, for example, due to many overlapping BSSs sharing the same channel. High delays in accessing the channel may cause poor user experience, for example, for latency sensitive traffic.

In some demonstrative embodiments, one possible approach to solve this problem of high delays may be to use an adaptive RU size selection mechanism based, for example, on measurable channel access delays, e.g., as described below.

In some demonstrative embodiments, device 102 may be configured to use a set of RU sizes, denoted $S'=[RU_1, RU_2, \ldots, RU_{max}]$, wherein $RU_1 < RU_2 < \ldots < RU_{max}$, for example, according to one or more IEEE 802.11 Standards and/or any other Standard.

In some demonstrative embodiments, in some cases it may not be possible to use large RU sizes to meet latency targets, for example, as contention among many nodes may cause high access delays.

In some demonstrative embodiments, an AP, e.g., device 102, may be restricted to use RUs from a set or RUs, denoted $S=[RU_1, RU_2, \ldots, RU_n]$, wherein $RU_1 \leq RU_2 \leq \ldots \leq RU_n$, for example, wherein $RU_n \leq RU_{max}$ denoted a maximal RU size to be used by the AP for RU allocations for a MU DL OFDMA PPDU transmission, e.g., as described below.

In some demonstrative embodiments, an AP, e.g., device 102, may be configured to keep track of an access delay, which may be determined, for example, as a total time spent in back-off and Network Allocation Vector (NAV) between two successful channel accesses by the AP. Any other definition may be implemented for determining the access delay.

In some demonstrative embodiments, the AP, e.g., device 102, may be configured to keep track of average access delays, e.g., averaged over multiple PPDUs. For example, network congestion may be inferred based on an average delay observed, denoted $D_{avg}$, for example, since a higher value of $D_{avg}$ may imply that, on average, many nodes are contending for the channel.

In some demonstrative embodiments, the AP, e.g., device 102, may be connected to N active STAs, e.g., STAs, which are not in sleep mode. In case that the maximum RU size RU n is to be permitted, then at least K STAs may be served by the AP in a MU DL OFDMA PPDU, where K may be determined, e.g., as follows:

$$K \triangleq \frac{B}{RU_n} \quad (1)$$

wherein B denotes a system bandwidth.

In some demonstrative embodiments, the largest RU size RU n for example, in order to meet a channel access average delay target, denoted $d^{Target}$, e.g., under equal resource allocation to STAs, may be determined, e.g., as based on the following criterion:

$$D_{avg} \times \frac{NRU_n}{B} \leq d^{target} \quad (2)$$

In some demonstrative embodiments, device 102 may be configured to determine and/or dynamically adjust the maximal RU size $RU_n$, for example, based on one or more, e.g., some or all, of the operations of the following algorithm:

Algorithm A:
Inputs:
1. N //Number of STAs in the system
2. S' //list of RU sizes, e.g., as permitted by 802.11 ax standards
3. $d^{target}$ //upper and lower thresholds for queue lengths
Initialize:
1. $D_{avg}=0$ //average channel access delay
Measurements/To Track:
1. $D_{curr}$ //Current channel access delay, i.e., total time spent
Main( )
    After every channel access:
        $D_{avg} \leftarrow (1-\alpha) D_{avg} + \alpha D_{curr}$ //update average access delay
        Choose the maximum RU N based on Equation (2)//choose the maximum RU size
        $S \leftarrow [RU_1, RU_2, \ldots RU_n]$//update the set of permitted RUs for the AP In other embodiments, the maximal RU size RU n may be determined according to any other suitable algorithm.

In some demonstrative embodiments, for example, as discussed above with Reference to FIG. 2, the peak throughput, which an STA can achieve for an OFDMA transmission may be dependent on its RU size. For example, as shown in FIG. 2, if the allocated RU size is too small to support the traffic generated by the STA, then a buffer at the AP, which stores the packets destined to the STA may increase over time. Eventually, when the buffer of the AP reaches a maximum limit, further packets may be dropped. Accordingly, a large buffer size may serve as an indication that an RU size being too small.

In some demonstrative embodiments, device 102 may be configured to determine and/or dynamically adjust an RU size to be allocated to a STA, for example, based on the buffer size for the STA, e.g., as maintained at the device 102, e.g., as described below.

In some demonstrative embodiments, device 102 may be configured to increase the RU size allocated to a STA, for example, as the buffer size for the STA increases, for example, by choosing a next higher RU size available for the STA.

In some demonstrative embodiments, for example, in case the traffic generated by a STA is low, e.g., if the amount of traffic is much less than a peak throughput that can be supported by the allocated RU size, then the efficiency of transmission, e.g., in terms of time used to transmit data when compared to the overhead, may be low.

In some demonstrative embodiments, device 102 may be configured to decrease the RU size allocated to a STA, for example, as the buffer size for the STA decreases, for example, by choosing a next lower RU size available for the STA.

In some demonstrative embodiments, device 102 may be configured to maintain the set of RUs $S=[RU_1, RU_2, \ldots, RU_n]$, wherein $RU_1 \leq RU_2 \leq \ldots \leq RU_n$, e.g., as described above.

In some demonstrative embodiments, for example, one initial of RU may be used for a plurality of STAs, e.g., for all the STAs, for example, in an initialization phase.

In some demonstrative embodiments, device 102 may be configured to keep track of a traffic arrival rate, denoted $\lambda_{avg}$, and of a maximum possible throughput, denoted $T_m=(T_i(RU_n))$, for an i-th STA for a given RU size.

In some demonstrative embodiments, two thresholds may be implemented. For example, an upper threshold, denoted $U_{th}$, may be utilized for determining when to increase the RU size, and/or a lower threshold, denoted $L_{th}$, may be utilized for determining when to decrease the RU size.

In some demonstrative embodiments, device 102 may be configured to increase the RU size, e.g., to a next higher RU size from S, for example, if the difference $(\lambda_{avg}-T_m)$ exceeds the upper threshold $U_{th}$.

In some demonstrative embodiments, device 102 may be configured to decrease the RU size, e.g., to a next lower RU size from S, for example, if the difference $(\lambda_{avg}-T_m)$ is less than the lower threshold $L_{th}$.

In some demonstrative embodiments, device 102 may be configured to determine and/or dynamically adjust the RU size for a STA, for example, based on one or more, e.g., some or all, operations of the following algorithm:

Algorithm B
Inputs:
1. N //Number of STAs in the system
2. S //list of RU sizes that can be used
3. $U_{th}$ and $L_{th}$ //upper and lower thresholds for queue lengths
4. Δ //periodicity of queue length measurements (e.g., in milliseconds)
$T_m(\ )$ //maximum throughput. as a function of the RU size
Initialize:
1. $\lambda_{avg}$=Zeros(1, N) //vector of average traffic arrival rates initialized to 0s
2. RU=$RU_2$×Ones(1, N)//vector of allocated RU sizes to STAs initialized to $RU_2$
Measurements/To Track:
1. $\Delta_{curr}$ //Vector of current arrival rates
2. Timer, which expires every Δ seconds
Main( )
  If (Timer expires)
    $A_{avg}\leftarrow(1-\alpha))\lambda_{avg}+\alpha\lambda_{curr}$ //update average traffic arrival rates
    For i=1:N:
      If $((\lambda_{avg}[i]-T_i(RU[i])\geq U_{th})$:
        RU[i]++ //choose the next higher RU size
      Elseif $((\lambda_{avg}[i]-T_i(RU[i])\leq L_{th})$:
        RUM[i]— //choose the next smaller RU size In some demonstrative embodiments, device 102 may be configured to determine and/or dynamically adjust the RU size for a STA, for example, based on an average queue length, for example, based on one or more, e.g., some or all, of the operations of the following algorithm:

Queue Length based algorithm $$Q_{curr}[i]\leftarrow Q_{curr}[i]+\text{No. of packet arriving in }\Delta\text{ time interval}-\text{No. of packets transmitted}-\text{No. of packets dropped} \quad (3)$$

Algorithm C
Inputs:
1. N //Number of STAs in the system
2. S //list of RU sizes that can be used
3. $Q_{th}^u$ and $Q_{th}^l$ //upper and lower thresholds for queue lengths
4. Δ //periodicity of queue length measurements (e.g., in milliseconds)
Initialize:
1. $Q_{avg}$=Zeros(1, N) // vector of average queue lengths initialized to 0s
2. RU=$RU_2$×Ones(1, N)//vector of allocated RU sizes to STAs initialized to $RU_2$
Measurements/To Track:
1. $Q_{curr}$ //Vector of current queue lengths updated using Equation 3
2. Timer which expires every Δ seconds
Main( )
  If (Timer expires)
    $Q_{avg}\leftarrow(1-\alpha)Q_{avg}+\alpha Q_{curr}$ //update average queue lengths
    For i=1:N:
      $(Q_{avg}[i]\geq Q_{th}^u)$:
        RU[i]++ //choose the next higher RU size
      Else if $(Q_{avg}[i]\leq Q_{th}^l)$:
        RU[i]— //choose the next smaller RU size In other embodiments, the RU size may be determined and/or adjusted according to any other additional or alternative algorithm, parameters and/or criteria.

Figure 3:
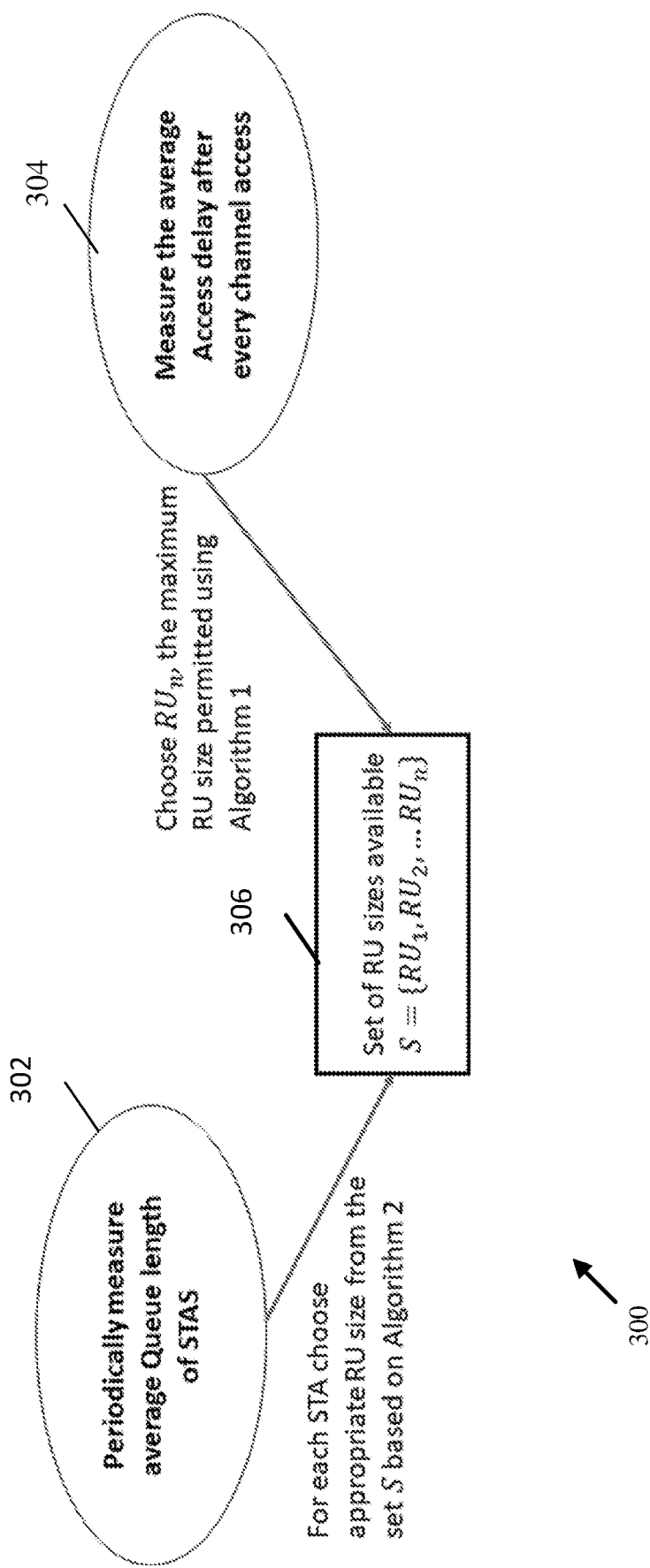
FIG. 3 is a schematic illustration of an RU allocation scheme, in accordance with some demonstrative embodiments.

Reference is made to FIG. 3, which schematically illustrates an RU allocation scheme 300, in accordance with some demonstrative embodiments. For example, device 102 (FIG. 1) may be configured determine and/or dynamically adjust RU sized for RU allocations to be used for a MU DL OFDMA PPDU transmission to devices 140, 160, 170 and/or 180 according to RU allocation scheme 300.

In some demonstrative embodiments, as shown in FIG. 3, an AP, e.g., device 102 (FIG. 1), may be configured to measure 302 at least on a traffic rate parameter, which is dependent on a traffic rate of DL traffic for a plurality of STAs, e.g., as described above. For example, the AP may measure an average queue length for the STAs, for example, periodically, e.g., as described above.

In some demonstrative embodiments, as shown in FIG. 3, the AP, e.g., device 102 (FIG. 1), may be configured to measure 304 a congestion parameter corresponding to a congestion over a wireless communication channel for communicating with the plurality of STAs, e.g., as described above. For example, the AP may measure an average access delay, for example, after each channel access, e.g., as described above.

In some demonstrative embodiments, as shown in FIG. 3, the AP, e.g., device 102 (FIG. 1), may be configured to determine and/or dynamically adjust 306 the set S of RU sizes, for example, based on the congestion parameter, e.g., as described above.

In some demonstrative embodiments, as shown in FIG. 3, the AP, e.g., device 102 (FIG. 1), may be configured to determine the allocations of an RU sizes for the plurality of STAs, for example, by selecting an RU size allocation for a STA from the SET S of RU sizes based, for example, on the traffic rate parameter for the STA, e.g., as described above.

Figure 4:
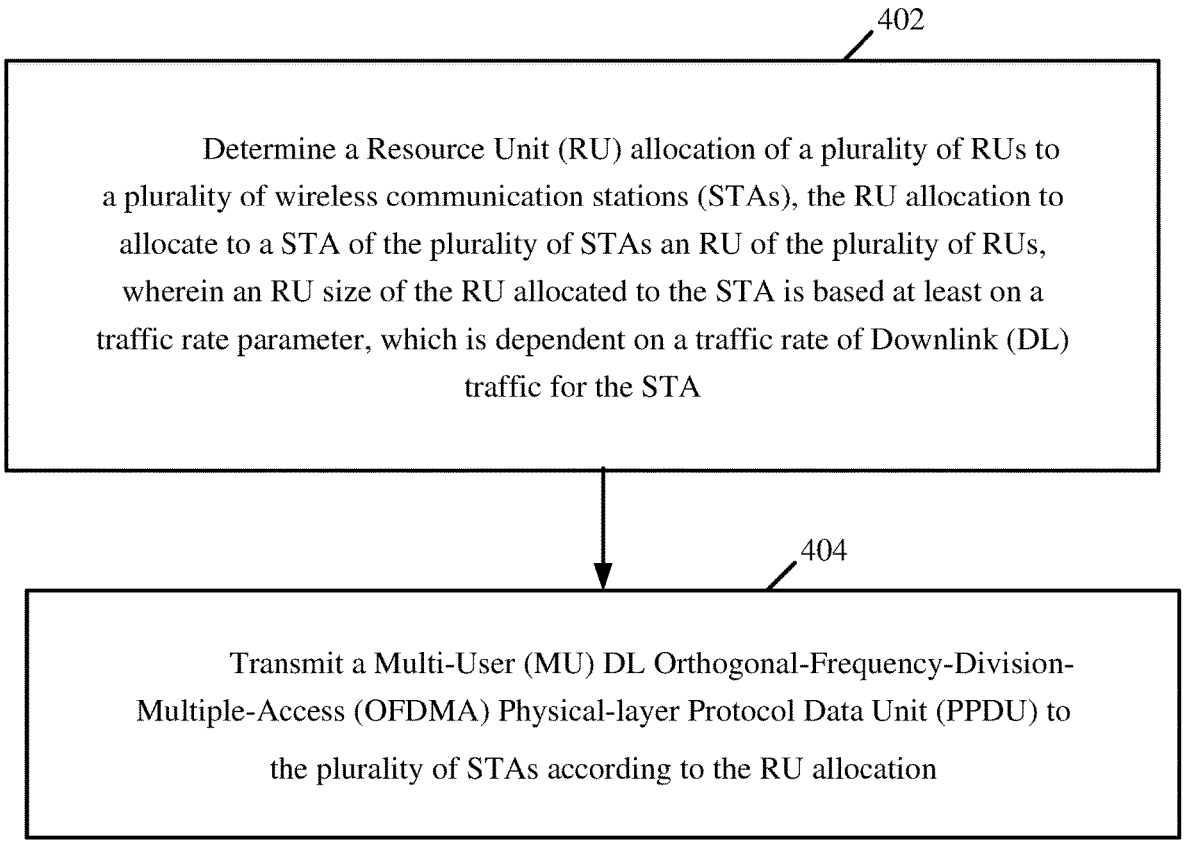
FIG. 4 is a schematic flow-chart illustration of a method of Multi-User (MU) downlink Orthogonal-Frequency-Division-Multiple-Access (OFDMA) transmission, in accordance with some demonstrative embodiments.

Reference is made to FIG. 4, which schematically illustrates a method of MU DL OFDMA transmission, in accordance with some demonstrative embodiments. For example, one or more of the operations of the method of FIG. 4 may be performed by a wireless communication system, e.g., system 100 (FIG. 1); a wireless communication device, e.g., device 102 (FIG. 1); a controller, e.g., controller 124 (FIG. 1); a radio, e.g., radio 114 (FIG. 1); a message processor, e.g., message processor 128 (FIG. 1); a transmitter, e.g., transmitter 118 (FIG. 1); and/or a receiver, e.g., receiver 116 (FIG. 1).

In some demonstrative embodiments, as indicated at block 402, the method may include determining an RU allocation of a plurality of RUs to a plurality of STAs, respectively. For example, the RU allocation may allocate to a STA of the plurality of STAs an RU of the plurality of RUs, for example, wherein an RU size of the RU allocated to the STA is based at least on a traffic rate parameter, which is dependent on a traffic rate of DL traffic for the STA. For example, device 102 (FIG. 1) may be configured to determine an RU allocation of a plurality of RUs to the devices 140, 160, 170 and/or 180 (FIG. 1), e.g., as described above.

In some demonstrative embodiments, as indicated at block 404, the method may include transmitting a MU DL OFDMA PPDU to the plurality of STAs according to the RU allocation. For example, device 102 (FIG. 1) may transmit the MU DL OFDMA PPDU to the devices 140, 160, 170 and/or 180 (FIG. 1) based on the RU allocation, e.g., as described above.

Figure 5:
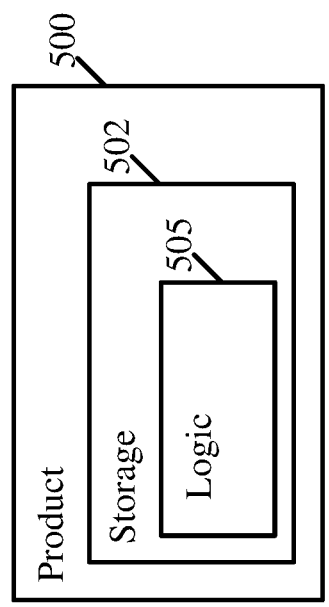
FIG. 5 is a schematic illustration of a product of manufacture, in accordance with some demonstrative embodiments.

Reference is made to FIG. 5, which schematically illustrates a product of manufacture 500, in accordance with some demonstrative embodiments. Product 500 may include one or more tangible computer-readable ("machine readable") non-transitory storage media 502, which may include computer-executable instructions, e.g., implemented by logic 504, operable to, when executed by at least one processor, e.g., computer processor, enable the at least one processor to implement one or more operations at device 102 (FIG. 1), radio 114 (FIG. 1), transmitter 118 (FIG. 1), receiver 116 (FIG. 1), controller 124 (FIG. 1), and/or message processor 128 (FIG. 1), to cause device 102 (FIG. 1), radio 114 (FIG. 1), transmitter 118 (FIG. 1), receiver 116 (FIG. 1), controller 124 (FIG. 1), and/or message processor 128 (FIG. 1) to perform one or more operations, and/or to perform, trigger and/or implement one or more operations, communications and/or functionalities described above with reference to FIGS. 1, 2, 3, and/or 4, and/or one or more operations described herein. The phrases "non-transitory machine-readable media (medium)" and "computer-readable non-transitory storage media (medium)" are directed to include all computer-readable media, with the sole exception being a transitory propagating signal.

In some demonstrative embodiments, product 500 and/or storage media 502 may include one or more types of computer-readable storage media capable of storing data, including volatile memory, non-volatile memory, removable or non-removable memory, erasable or non-erasable memory, writeable or re-writeable memory, and the like. For example, storage media 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless communication device to determine a Resource Unit (RU) allocation of a plurality of RUs to a plurality of wireless communication stations (STAs), the RU allocation to allocate to a STA of the plurality of STAs an RU of the plurality of RUs, wherein an RU size of the RU allocated to the STA is based at least on a traffic rate parameter, which is dependent on a traffic rate of Downlink (DL) traffic for the STA; and transmit a Multi-User (MU) DL Orthogonal-Frequency-Division-Multiple-Access (OFDMA) Physical-layer Protocol Data Unit (PPDU) to the plurality of STAs according to the RU allocation.

Example 2 includes the subject matter of Example 1, and optionally, wherein the apparatus is configured to cause the wireless communication device to monitor an average traffic rate of the DL traffic for the STA, and to dynamically adjust the RU size of the RU allocated to the STA based on the average traffic rate and an available throughout corresponding to the RU size.

Example 3 includes the subject matter of Example 2, and optionally, wherein the apparatus is configured to cause the wireless communication device to increase the RU size of the RU allocated to the STA when a difference between the average traffic rate and the available throughout is greater than a traffic rate upper threshold.

Example 4 includes the subject matter of Example 2 or 3, and optionally, wherein the apparatus is configured to cause the wireless communication device to reduce the RU size of the RU allocated to the STA when a difference between the average traffic rate and the available throughout is less than a traffic rate lower threshold.

Example 5 includes the subject matter of any one of Examples 1-4, and optionally, wherein the apparatus is configured to cause the wireless communication device to determine the RU size of the RU allocated to the STA based at least on a queue length of a queue for buffering the DL traffic for the STA.

Example 6 includes the subject matter of Example 5, and optionally, wherein the apparatus is configured to cause the wireless communication device to monitor an average queue length of the queue for buffering the DL traffic for the STA, and to dynamically adjust the RU size of the RU allocated to the STA based on the average queue length.

Example 7 includes the subject matter of Example 6, and optionally, wherein the apparatus is configured to cause the wireless communication device to increase the RU size of the RU allocated to the STA when the average queue length is greater than a queue upper threshold.

Example 8 includes the subject matter of Example 6 or 7, and optionally, wherein the apparatus is configured to cause the wireless communication device to reduce the RU size of the RU allocated to the STA when the average queue length is less than a queue lower threshold.

Example 9 includes the subject matter of any one of Examples 1-8, and optionally, wherein the apparatus is configured to cause the wireless communication device to select the RU size of the RU allocated to the STA from a set of RU sizes comprising a plurality of different RU sizes.

Example 10 includes the subject matter of Example 9, and optionally, wherein the apparatus is configured to cause the wireless communication device to adjust the set of RU sizes based at least on a congestion parameter corresponding to a congestion over a wireless communication channel for communicating with the plurality of STAs.

Example 11 includes the subject matter of Example 9 or 10, and optionally, wherein the apparatus is configured to cause the wireless communication device to determine a maximal RU size of the plurality of RU sizes in the set of RU sizes based at least on a congestion parameter corresponding to a congestion over a wireless communication channel for communicating with the plurality of STAs.

Example 12 includes the subject matter of Example 11, and optionally, wherein the apparatus is configured to cause the wireless communication device to determine the maximal RU size based on an access delay of the wireless communication device to access the wireless communication channel.

Example 13 includes the subject matter of Example 12, and optionally, wherein the apparatus is configured to cause the wireless communication device to monitor an average access delay for accessing the wireless communication channel, and to dynamically adjust the maximal RU size based on a criterion relating to the average access delay, a target access delay, and a count of the plurality of STAs.

Example 14 includes the subject matter of any one of Examples 1-13, and optionally, wherein the wireless communication device is an Access Point (AP).

Example 15 includes the subject matter of any one of Examples 1-14, and optionally, comprising a radio to transmit the MU DL OFDMA transmission.

Example 16 includes the subject matter of Example 15, and optionally, comprising one or more antennas connected to the radio, a memory to store data processed by the wireless communication device, and a processor to execute instructions of an operating system.

Example 17 includes a system of wireless communication comprising a wireless communication device, the wireless communication device comprising one or more antennas; a radio; a memory; a processor; and a controller configured to cause the wireless communication device to determine a Resource Unit (RU) allocation of a plurality of RUs to a plurality of wireless communication stations (STAs), the RU allocation to allocate to a STA of the plurality of STAs an RU of the plurality of RUs, wherein an RU size of the RU allocated to the STA is based at least on a traffic rate parameter, which is dependent on a traffic rate of Downlink (DL) traffic for the STA; and transmit a Multi-User (MU) DL Orthogonal-Frequency-Division-Multiple-Access (OFDMA) Physical-layer Protocol Data Unit (PPDU) to the plurality of STAs according to the RU allocation.

Example 18 includes the subject matter of Example 17, and optionally, wherein the controller is configured to cause the wireless communication device to monitor an average traffic rate of the DL traffic for the STA, and to dynamically adjust the RU size of the RU allocated to the STA based on the average traffic rate and an available throughout corresponding to the RU size.

Example 19 includes the subject matter of Example 18, and optionally, wherein the controller is configured to cause the wireless communication device to increase the RU size of the RU allocated to the STA when a difference between the average traffic rate and the available throughout is greater than a traffic rate upper threshold.

Example 20 includes the subject matter of Example 18 or 19, and optionally, wherein the controller is configured to cause the wireless communication device to reduce the RU size of the RU allocated to the STA when a difference between the average traffic rate and the available throughout is less than a traffic rate lower threshold.

Example 21 includes the subject matter of any one of Examples 17-20, and optionally, wherein the controller is configured to cause the wireless communication device to determine the RU size of the RU allocated to the STA based at least on a queue length of a queue for buffering the DL traffic for the STA.

Example 22 includes the subject matter of Example 21, and optionally, wherein the controller is configured to cause the wireless communication device to monitor an average queue length of the queue for buffering the DL traffic for the STA, and to dynamically adjust the RU size of the RU allocated to the STA based on the average queue length.

Example 23 includes the subject matter of Example 22, and optionally, wherein the controller is configured to cause the wireless communication device to increase the RU size of the RU allocated to the STA when the average queue length is greater than a queue upper threshold.

Example 24 includes the subject matter of Example 22 or 23, and optionally, wherein the controller is configured to cause the wireless communication device to reduce the RU size of the RU allocated to the STA when the average queue length is less than a queue lower threshold.

Example 25 includes the subject matter of any one of Examples 17-24, and optionally, wherein the controller is configured to cause the wireless communication device to select the RU size of the RU allocated to the STA from a set of RU sizes comprising a plurality of different RU sizes.

Example 26 includes the subject matter of Example 25, and optionally, wherein the controller is configured to cause the wireless communication device to adjust the set of RU sizes based at least on a congestion parameter corresponding to a congestion over a wireless communication channel for communicating with the plurality of STAs.

Example 27 includes the subject matter of Example 25 or 26, and optionally, wherein the controller is configured to cause the wireless communication device to determine a maximal RU size of the plurality of RU sizes in the set of RU sizes based at least on a congestion parameter corresponding to a congestion over a wireless communication channel for communicating with the plurality of STAs.

Example 28 includes the subject matter of Example 27, and optionally, wherein the controller is configured to cause the wireless communication device to determine the maximal RU size based on an access delay of the wireless communication device to access the wireless communication channel.

Example 29 includes the subject matter of Example 28, and optionally, wherein the controller is configured to cause the wireless communication device to monitor an average access delay for accessing the wireless communication channel, and to dynamically adjust the maximal RU size based on a criterion relating to the average access delay, a target access delay, and a count of the plurality of STAs.

Example 30 includes the subject matter of any one of Examples 17-29, and optionally, wherein the wireless communication device is an Access Point (AP).

Example 31 includes a method to be performed by a wireless communication device, the method comprising determining a Resource Unit (RU) allocation of a plurality of RUs to a plurality of wireless communication stations (STAs), the RU allocation to allocate to a STA of the plurality of STAs an RU of the plurality of RUs, wherein an RU size of the RU allocated to the STA is based at least on a traffic rate parameter, which is dependent on a traffic rate of Downlink (DL) traffic for the STA; and transmitting a Multi-User (MU) DL Orthogonal-Frequency-Division-Multiple-Access (OFDMA) Physical-layer Protocol Data Unit (PPDU) to the plurality of STAs according to the RU allocation.

Example 32 includes the subject matter of Example 31, and optionally, comprising monitoring an average traffic rate of the DL traffic for the STA, and dynamically adjusting the RU size of the RU allocated to the STA based on the average traffic rate and an available throughout corresponding to the RU size.

Example 33 includes the subject matter of Example 32, and optionally, comprising increasing the RU size of the RU allocated to the STA when a difference between the average traffic rate and the available throughout is greater than a traffic rate upper threshold.

Example 34 includes the subject matter of Example 32 or 33, and optionally, comprising reducing the RU size of the RU allocated to the STA when a difference between the average traffic rate and the available throughout is less than a traffic rate lower threshold.

Example 35 includes the subject matter of any one of Examples 31-34, and optionally, comprising determining the RU size of the RU allocated to the STA based at least on a queue length of a queue for buffering the DL traffic for the STA.

Example 36 includes the subject matter of Example 35, and optionally, comprising monitoring an average queue length of the queue for buffering the DL traffic for the STA, and dynamically adjusting the RU size of the RU allocated to the STA based on the average queue length.

Example 37 includes the subject matter of Example 36, and optionally, comprising increasing the RU size of the RU allocated to the STA when the average queue length is greater than a queue upper threshold.

Example 38 includes the subject matter of Example 36 or 37, and optionally, comprising reducing the RU size of the RU allocated to the STA when the average queue length is less than a queue lower threshold.

Example 39 includes the subject matter of any one of Examples 31-38, and optionally, comprising selecting the RU size of the RU allocated to the STA from a set of RU sizes comprising a plurality of different RU sizes.

Example 40 includes the subject matter of Example 39, and optionally, comprising adjusting the set of RU sizes based at least on a congestion parameter corresponding to a congestion over a wireless communication channel for communicating with the plurality of STAs.

Example 41 includes the subject matter of Example 39 or 40, and optionally, comprising determining a maximal RU size of the plurality of RU sizes in the set of RU sizes based at least on a congestion parameter corresponding to a congestion over a wireless communication channel for communicating with the plurality of STAs.

Example 42 includes the subject matter of Example 41, and optionally, comprising determining the maximal RU size based on an access delay of the wireless communication device to access the wireless communication channel.

Example 43 includes the subject matter of Example 42, and optionally, comprising monitoring an average access delay for accessing the wireless communication channel, and dynamically adjusting the maximal RU size based on a criterion relating to the average access delay, a target access delay, and a count of the plurality of STAs.

Example 44 includes the subject matter of any one of Examples 31-43, and optionally, wherein the wireless communication device is an Access Point (AP).

Example 45 includes a product comprising one or more tangible computer-readable non-transitory storage media comprising computer-executable instructions operable to, when executed by at least one processor, enable the at least one processor to cause a wireless communication device to determine a Resource Unit (RU) allocation of a plurality of RUs to a plurality of wireless communication stations (STAs), the RU allocation to allocate to a STA of the plurality of STAs an RU of the plurality of RUs, wherein an RU size of the RU allocated to the STA is based at least on a traffic rate parameter, which is dependent on a traffic rate of Downlink (DL) traffic for the STA; and transmit a Multi-User (MU) DL Orthogonal-Frequency-Division-Multiple-Access (OFDMA) Physical-layer Protocol Data Unit (PPDU) to the plurality of STAs according to the RU allocation.

Example 46 includes the subject matter of Example 45, and optionally, wherein the instructions, when executed, cause the wireless communication device to monitor an average traffic rate of the DL traffic for the STA, and to dynamically adjust the RU size of the RU allocated to the STA based on the average traffic rate and an available throughout corresponding to the RU size.

Example 47 includes the subject matter of Example 46, and optionally, wherein the instructions, when executed, cause the wireless communication device to increase the RU size of the RU allocated to the STA when a difference between the average traffic rate and the available throughout is greater than a traffic rate upper threshold.

Example 48 includes the subject matter of Example 46 or 47, and optionally, wherein the instructions, when executed, cause the wireless communication device to reduce the RU size of the RU allocated to the STA when a difference between the average traffic rate and the available throughout is less than a traffic rate lower threshold.

Example 49 includes the subject matter of any one of Examples 45-48, and optionally, wherein the instructions, when executed, cause the wireless communication device to determine the RU size of the RU allocated to the STA based at least on a queue length of a queue for buffering the DL traffic for the STA.

Example 50 includes the subject matter of Example 49, and optionally, wherein the instructions, when executed, cause the wireless communication device to monitor an average queue length of the queue for buffering the DL traffic for the STA, and to dynamically adjust the RU size of the RU allocated to the STA based on the average queue length.

Example 51 includes the subject matter of Example 50, and optionally, wherein the instructions, when executed, cause the wireless communication device to increase the RU size of the RU allocated to the STA when the average queue length is greater than a queue upper threshold.

Example 52 includes the subject matter of Example 50 or 51, and optionally, wherein the instructions, when executed, cause the wireless communication device to reduce the RU size of the RU allocated to the STA when the average queue length is less than a queue lower threshold.

Example 53 includes the subject matter of any one of Examples 45-52, and optionally, wherein the instructions, when executed, cause the wireless communication device to select the RU size of the RU allocated to the STA from a set of RU sizes comprising a plurality of different RU sizes.

Example 54 includes the subject matter of Example 53, and optionally, wherein the instructions, when executed, cause the wireless communication device to adjust the set of RU sizes based at least on a congestion parameter corresponding to a congestion over a wireless communication channel for communicating with the plurality of STAs.

Example 55 includes the subject matter of Example 53 or 54, and optionally, wherein the instructions, when executed, cause the wireless communication device to determine a maximal RU size of the plurality of RU sizes in the set of RU sizes based at least on a congestion parameter corresponding to a congestion over a wireless communication channel for communicating with the plurality of STAs.

Example 56 includes the subject matter of Example 55, and optionally, wherein the instructions, when executed, cause the wireless communication device to determine the maximal RU size based on an access delay of the wireless communication device to access the wireless communication channel.

Example 57 includes the subject matter of Example 56, and optionally, wherein the instructions, when executed, cause the wireless communication device to monitor an average access delay for accessing the wireless communication channel, and to dynamically adjust the maximal RU size based on a criterion relating to the average access delay, a target access delay, and a count of the plurality of STAs.

Example 58 includes the subject matter of any one of Examples 45-57, and optionally, wherein the wireless communication device is an Access Point (AP).

Example 59 includes an apparatus of wireless communication by a wireless communication device, the apparatus comprising means for determining a Resource Unit (RU) allocation of a plurality of RUs to a plurality of wireless communication stations (STAs), the RU allocation to allocate to a STA of the plurality of STAs an RU of the plurality of RUs, wherein an RU size of the RU allocated to the STA is based at least on a traffic rate parameter, which is dependent on a traffic rate of Downlink (DL) traffic for the STA; and means for causing the wireless communication device to transmit a Multi-User (MU) DL Orthogonal-Frequency-Division-Multiple-Access (OFDMA) Physical-layer Protocol Data Unit (PPDU) to the plurality of STAs according to the RU allocation.

Example 60 includes the subject matter of Example 59, and optionally, comprising means for monitoring an average traffic rate of the DL traffic for the STA, and dynamically adjusting the RU size of the RU allocated to the STA based on the average traffic rate and an available throughout corresponding to the RU size.

Example 61 includes the subject matter of Example 60, and optionally, comprising means for increasing the RU size of the RU allocated to the STA when a difference between the average traffic rate and the available throughout is greater than a traffic rate upper threshold.

Example 62 includes the subject matter of Example 60 or 61, and optionally, comprising means for reducing the RU size of the RU allocated to the STA when a difference between the average traffic rate and the available throughout is less than a traffic rate lower threshold.

Example 63 includes the subject matter of any one of Examples 59-62, and optionally, comprising means for determining the RU size of the RU allocated to the STA based at least on a queue length of a queue for buffering the DL traffic for the STA.

Example 64 includes the subject matter of Example 63, and optionally, comprising means for monitoring an average queue length of the queue for buffering the DL traffic for the STA, and dynamically adjusting the RU size of the RU allocated to the STA based on the average queue length.

Example 65 includes the subject matter of Example 64, and optionally, comprising means for increasing the RU size of the RU allocated to the STA when the average queue length is greater than a queue upper threshold.

Example 66 includes the subject matter of Example 64 or 65, and optionally, comprising means for reducing the RU size of the RU allocated to the STA when the average queue length is less than a queue lower threshold.

Example 67 includes the subject matter of any one of Examples 59-66, and optionally, comprising means for selecting the RU size of the RU allocated to the STA from a set of RU sizes comprising a plurality of different RU sizes.

Example 68 includes the subject matter of Example 67, and optionally, comprising means for adjusting the set of RU sizes based at least on a congestion parameter corresponding to a congestion over a wireless communication channel for communicating with the plurality of STAs.

Example 69 includes the subject matter of Example 67 or 68, and optionally, comprising means for determining a maximal RU size of the plurality of RU sizes in the set of RU sizes based at least on a congestion parameter corresponding to a congestion over a wireless communication channel for communicating with the plurality of STAs.

Example 70 includes the subject matter of Example 69, and optionally, comprising means for determining the maximal RU size based on an access delay of the wireless communication device to access the wireless communication channel.

Example 71 includes the subject matter of Example 70, and optionally, comprising means for monitoring an average access delay for accessing the wireless communication channel, and dynamically adjusting the maximal RU size based on a criterion relating to the average access delay, a target access delay, and a count of the plurality of STAs.

Example 72 includes the subject matter of any one of Examples 59-71, and optionally, wherein the wireless communication device is an Access Point (AP).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless communication device to:
   determine a Resource Unit (RU) allocation of a plurality of RUs to a plurality of wireless communication stations (STAs), the RU allocation to allocate to a STA of the plurality of STAs an RU of the plurality of RUs, wherein an RU size of the RU allocated to the STA is based at least on a traffic rate parameter, which is dependent on a traffic rate of Downlink (DL) traffic for the STA; and
   transmit a Multi-User (MU) DL Orthogonal-Frequency-Division-Multiple-Access (OFDMA) Physical-layer Protocol Data Unit (PPDU) to the plurality of STAs according to the RU allocation,
   wherein the apparatus is configured to cause the wireless communication device to monitor an average traffic rate of the DL traffic for the STA, and to adjust the RU size of the RU allocated to the STA based on a comparison between a threshold and a difference between the average traffic rate and an available throughout corresponding to the RU size.

2. The apparatus of claim 1 configured to cause the wireless communication device to increase the RU size of the RU allocated to the STA when the difference between the average traffic rate and the available throughout is greater than a traffic rate upper threshold.

3. The apparatus of claim 1 configured to cause the wireless communication device to reduce the RU size of the RU allocated to the STA when the difference between the average traffic rate and the available throughout is less than a traffic rate lower threshold.

4. The apparatus of claim 1 configured to cause the wireless communication device to determine the RU size of the RU allocated to the STA based at least on a queue length of a queue for buffering the DL traffic for the STA.

5. The apparatus of claim 4 configured to cause the wireless communication device to monitor an average queue length of the queue for buffering the DL traffic for the STA, and to dynamically adjust the RU size of the RU allocated to the STA based on the average queue length.

6. The apparatus of claim 5 configured to cause the wireless communication device to increase the RU size of the RU allocated to the STA when the average queue length is greater than a queue upper threshold.

7. The apparatus of claim 5 configured to cause the wireless communication device to reduce the RU size of the RU allocated to the STA when the average queue length is less than a queue lower threshold.

8. The apparatus of claim 1 configured to cause the wireless communication device to select the RU size of the RU allocated to the STA from a set of RU sizes comprising a plurality of different RU sizes.

9. The apparatus of claim 8 configured to cause the wireless communication device to adjust the set of RU sizes based at least on a congestion parameter corresponding to a congestion over a wireless communication channel for communicating with the plurality of STAs.

10. The apparatus of claim 8 configured to cause the wireless communication device to determine a maximal RU size of the plurality of RU sizes in the set of RU sizes based at least on a congestion parameter corresponding to a congestion over a wireless communication channel for communicating with the plurality of STAs.

11. The apparatus of claim 10 configured to cause the wireless communication device to determine the maximal RU size based on an access delay of the wireless communication device to access the wireless communication channel.

12. The apparatus of claim 11 configured to cause the wireless communication device to monitor an average access delay for accessing the wireless communication channel, and to dynamically adjust the maximal RU size based on a criterion relating to the average access delay, a target access delay, and a count of the plurality of STAs.

13. The apparatus of claim 1, wherein the wireless communication device is an Access Point (AP).

14. The apparatus of claim 1 comprising a radio to transmit the MU DL OFDMA PPDU.

15. The apparatus of claim 14 comprising one or more antennas connected to the radio, a memory to store data processed by the wireless communication device, and a processor to execute instructions of an operating system.

16. A product comprising one or more tangible computer-readable non-transitory storage media comprising computer-executable instructions operable to, when executed by at least one processor, enable the at least one processor to cause a wireless communication device to:
   determine a Resource Unit (RU) allocation of a plurality of RUs to a plurality of wireless communication stations (STAs), the RU allocation to allocate to a STA of the plurality of STAs an RU of the plurality of RUs, wherein an RU size of the RU allocated to the STA is based at least on a traffic rate parameter, which is dependent on a traffic rate of Downlink (DL) traffic for the STA; and
   transmit a Multi-User (MU) DL Orthogonal-Frequency-Division-Multiple-Access (OFDMA) Physical-layer Protocol Data Unit (PPDU) to the plurality of STAs according to the RU allocation,
   wherein instructions, when executed, cause the wireless communication device to monitor an average traffic rate of the DL traffic for the STA, and to adjust the RU size of the RU allocated to the STA based on a comparison between a threshold and a difference between the average traffic rate and an available throughout corresponding to the RU size.

17. The product of claim 16, wherein the instructions, when executed, cause the wireless communication device to increase the RU size of the RU allocated to the STA when the difference between the average traffic rate and the available throughout is greater than a traffic rate upper threshold.

18. The product of claim 16, wherein the instructions, when executed, cause the wireless communication device to determine the RU size of the RU allocated to the STA based at least on a queue length of a queue for buffering the DL traffic for the STA.

19. The product of claim 16, wherein the instructions, when executed, cause the wireless communication device to select the RU size of the RU allocated to the STA from a set of RU sizes comprising a plurality of different RU sizes.

20. The product of claim 19, wherein the instructions, when executed, cause the wireless communication device to adjust the set of RU sizes based at least on a congestion parameter corresponding to a congestion over a wireless communication channel for communicating with the plurality of STAs.

21. The product of claim 19, wherein the instructions, when executed, cause the wireless communication device to determine a maximal RU size of the plurality of RU sizes in the set of RU sizes based at least on a congestion parameter corresponding to a congestion over a wireless communication channel for communicating with the plurality of STAs.

22. The product of claim 21, wherein the instructions, when executed, cause the wireless communication device to determine the maximal RU size based on an access delay of the wireless communication device to access the wireless communication channel.

23. An apparatus of wireless communication by a wireless communication device, the apparatus comprising:
- means for determining a Resource Unit (RU) allocation of a plurality of RUs to a plurality of wireless communication stations (STAs), the RU allocation to allocate to a STA of the plurality of STAs an RU of the plurality of RUs, wherein an RU size of the RU allocated to the STA is based at least on a traffic rate parameter, which is dependent on a traffic rate of Downlink (DL) traffic for the STA; and
- means for causing the wireless communication device to transmit a Multi-User (MU) DL Orthogonal-Frequency-Division-Multiple-Access (OFDMA) Physical-layer Protocol Data Unit (PPDU) to the plurality of STAs according to the RU allocation,
wherein the means for determining the RU allocation comprises means for monitoring an average traffic rate of the DL traffic for the STA, and adjusting the RU size of the RU allocated to the STA based on a comparison between a threshold and a difference between the average traffic rate and an available throughout corresponding to the RU size.

24. The apparatus of claim 23 comprising means for determining the RU size of the RU allocated to the STA based at least on a queue length of a queue for buffering the DL traffic for the STA.

* * * * *